US011030065B2

(12) United States Patent
Wong et al.

(10) Patent No.: US 11,030,065 B2
(45) Date of Patent: Jun. 8, 2021

(54) APPARATUS AND METHOD OF GENERATING RANDOM NUMBERS

(71) Applicant: Arm Limited, Cambridge (GB)

(72) Inventors: Kar-Lik Kasim Wong, Wokingham (GB); Alessandro Renzi, Cambridge (GB); Michael Weiner, Ness-Ziona (IL); Avi Shif, Netanya (IL); Oded Golombek, Even Yehuda (IL)

(73) Assignee: Arm Limited, Cambridge (GB)

( * ) Notice: Subject to any disclaimer, the term of this patent is extended or adjusted under 35 U.S.C. 154(b) by 231 days.

(21) Appl. No.: 16/190,335

(22) Filed: Nov. 14, 2018

(65) Prior Publication Data

US 2020/0151077 A1    May 14, 2020

(51) Int. Cl.
*G06F 11/277* (2006.01)
*G06F 7/58* (2006.01)
*H04L 9/00* (2006.01)

(52) U.S. Cl.
CPC ........... *G06F 11/277* (2013.01); *G06F 7/582* (2013.01); *G06F 7/588* (2013.01); *H04L 9/004* (2013.01); *H04L 2209/08* (2013.01)

(58) Field of Classification Search
CPC ........... G06F 7/582; G06F 7/588; H04L 9/004
See application file for complete search history.

(56) References Cited

U.S. PATENT DOCUMENTS

| 2010/0106756 | A1* | 4/2010 | Ellison | H04L 9/3242 708/212 |
| 2011/0047545 | A1* | 2/2011 | Ellison | G06F 9/45558 718/1 |
| 2012/0179735 | A1* | 7/2012 | Ferguson | G06F 7/58 708/254 |
| 2014/0195576 | A1* | 7/2014 | Kaplan | G06F 7/588 708/250 |
| 2018/0052662 | A1* | 2/2018 | Dale | G06F 7/58 |

* cited by examiner

*Primary Examiner* — Michael D. Yaary
(74) *Attorney, Agent, or Firm* — Nixon & Vanderhye P.C.

(57) ABSTRACT

Aspects of the present disclosure relate to an apparatus comprising analogue circuitry comprising an entropy source, the entropy source being configured to provide a random output. The apparatus comprises first digital circuitry to receive the output of the entropy source and, based on said output, generate random numbers, and second digital circuitry to receive the output of the entropy source and, based on said output, generate random numbers, the second digital circuitry being a duplicate of the first digital circuitry. The apparatus comprises difference detection circuitry to determine a difference of operation between the first digital circuitry and the second digital circuitry. Each of the first digital circuitry and the second digital circuitry comprises entropy checking circuitry to check the entropy of the output of the entropy source.

20 Claims, 5 Drawing Sheets

APPARATUS AND METHOD OF GENERATING RANDOM NUMBERS

BACKGROUND

Technical Field

The present technique relates to the field of processing devices.

Technical Background

Some data processing systems utilise random numbers, for example as inputs to cryptographic functions. These random numbers can be deterministically generated "pseudo-random numbers", typically generated based on a seed such that, whilst exhibiting statistical randomness, the same seed will always result in generation of the same pseudo-random number. However, it can be desirable for some applications to generate non-deterministically-generated "true random numbers", for example for security reasons. For example, such true random numbers may be generated from an underlying physical process exhibiting statistically random behaviour, such as thermal noise or quantum mechanical phenomena.

In some processing systems, for example in safety-critical systems such as in automated vehicles, it is desirable to provide resistance to faults. It can be difficult to provide fault resistance in systems including true random number generators because some methods of providing fault resistance cannot be applied. For example, the processing functionality cannot be redundantly duplicated because two duplicated true random number generators would provide different outputs even when working correctly. A difference in output would thus not necessarily be indicative of a fault.

SUMMARY

At least some examples provide an apparatus comprising:
analogue circuitry comprising an entropy source, the entropy source being configured to provide a random output;
first digital circuitry to receive the output of the entropy source and, based on said output, generate random numbers;
second digital circuitry to receive the output of the entropy source and, based on said output, generate random numbers, the second digital circuitry being a duplicate of the first digital circuitry; and
difference detection circuitry to determine a difference of operation between the first digital circuitry and the second digital circuitry,
wherein each of the first digital circuitry and the second digital circuitry comprises entropy checking circuitry to check the entropy of the output of the entropy source.

Further examples provide a method comprising:
receiving, at first digital circuitry and second digital circuitry a random output from an entropy source, the second digital circuitry being a duplicate of the first digital circuitry;
with the first digital circuitry:
generating random numbers based on said output; and
checking the entropy of said output,
with the second digital circuitry:
generating random numbers based on said output; and
checking the entropy of said output, and
determining a difference of operation between the first digital circuitry and the second digital circuitry.

Further examples provide an apparatus comprising:
analogue means for providing an entropy source, the entropy source being configured to provide a random output;
first digital means for receiving the output of the entropy source and, based on said output, generate random numbers;
second digital means for receiving the output of the entropy source and, based on said output, generate random numbers, the second digital means being a duplicate of the first digital means; and
difference detection means for determining a difference of operation between the first digital means and the second digital means,
wherein each of the first digital means and the second digital means comprises entropy checking means for checking the entropy of the output of the entropy source.

Further aspects, features and advantages of the present technique will be apparent from the following description of examples, which is to be read in conjunction with the accompanying drawings.

DESCRIPTION OF EXAMPLES

Figure 1:
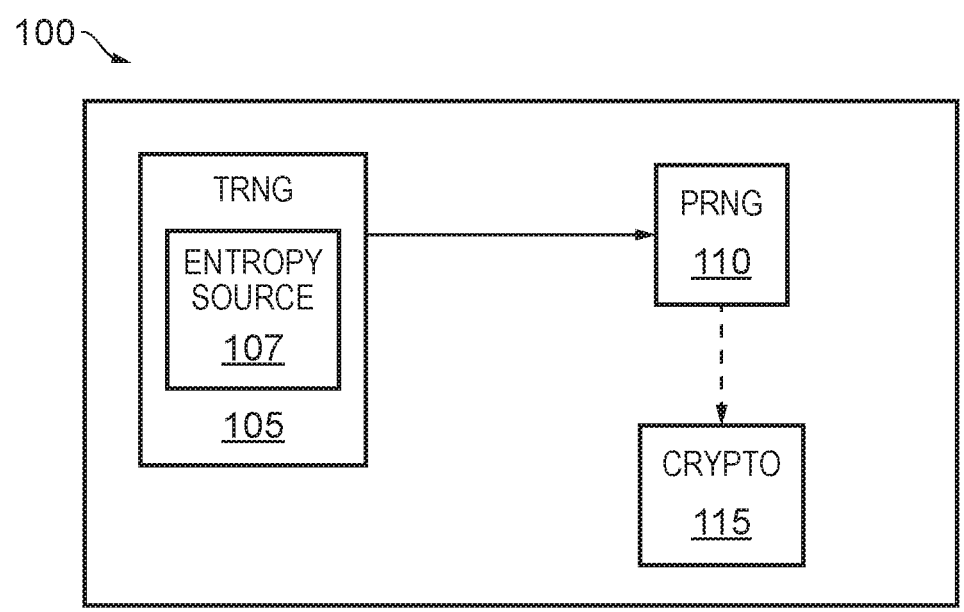
FIG. 1 shows a comparative apparatus.

As set out above, a processing apparatus according to one example can comprise analogue circuitry comprising an entropy source, the entropy source being configured to provide a random output. The random output can be considered "true" random in that it is not deterministically based on an input. For example, the entropy source may produce its output based on an inherently random physical process therein, such as thermal noise.

The processing apparatus comprises first and second digital circuitry, the second circuitry being a duplicate of the first. Each such digital circuitry is configured to receive the output of the entropy source and, based on this output, generate random numbers. For example, the circuitry may transform or otherwise modify the output of the entropy source to produce uniformly distributed true random numbers. As the first and second circuitry are duplicates, and each receives the same random output from the entropy source, assuming fault-free operation the first and second digital circuitry would operate simultaneously in the same manner and thereby produce the same random numbers.

The apparatus comprises difference detection circuitry to determine a difference of operation between the first and second digital circuitry. As noted above, during fault-free operation the first and second circuitry operate in the same manner. Any difference of operation, for example a difference between random numbers generated by the first digital circuitry and corresponding random numbers generated by the second digital circuitry, can thus be considered to indicate a fault in the operation of one of the first and second circuitry. A suitable fault mitigation operation can then be performed, for example repeating the present operation, signalling an error, or shutting down the system.

Each of the first digital circuitry and the second digital circuitry comprises entropy checking circuitry to check the entropy of the output of the entropy source. For example, the entropy may be checked by analysis of the random numbers generated by the associated digital circuitry. The entropy of the output of the entropy source quantifies the randomness of that output and thus checking this entropy serves to confirm that the entropy source is functioning correctly and producing an output that is suitably random. A "silent" failure, in which the entropy source continues to produce an output but that output is not sufficiently random, can thereby be identified. Such silent failures can compromise the security of cryptographic operations based on the random numbers, and thereby allow an attacker to decrypt or tamper with a communication.

For example, the entropy checking circuitry of the first and/or second digital circuitry may be configured to signal an error when the output of the entropy source has a degree of randomness below an acceptable level. Alternatively or additionally, where the determined entropy indicates that a given output of the entropy source indicates a degree of randomness below an acceptable level, the given output may be excluded from further processing. The randomness can thus be tuned whilst averting more drastic actions such as shutting down the system, and thereby allowing continuing operation.

Further, because the entropy checking circuitry is duplicated, an error in the operation of the entropy checking function can also be detected, through operation of the earlier-mentioned difference detection circuitry. Thus, if the outputs from the entropy checkers differ, this will be detected.

The present example thus includes an analogue part coupled with a duplicated digital part. A redundantly safe apparatus for generating true random numbers can thereby be provided, despite the aforementioned problem with providing true random numbers in a fault-resistant manner.

In examples, the entropy checking operation performed by each of the entropy checking circuitry of the first digital circuitry, and the entropy checking circuitry of the second digital circuitry, is a run-time entropy checking operation. Entropy checking can thus be repeatedly applied during run-time to ensure ongoing integrity of the entropy source. This provides increased fault resistance over comparative systems in which entropy is checked less frequently, for example systems in which a hardware entropy checking unit checks entropy of the entropy source at start-up but does not perform further checking.

The entropy checking circuitry of the first digital circuitry and the entropy checking circuitry of the second digital circuitry may be implemented within respective processing circuitry, each processing circuitry being configured to receive random numbers generated within the associated digital circuitry as an input to data processing operations. For example, these data processing operations may be cryptographic operations based on the received random numbers. This implementation of the entropy checking within processing circuitry can provide an especially efficient means for performing run-time entropy checking. As one particular example, the entropy checking circuitry can be implemented in firmware of the respective processing circuitry.

Each of the entropy checking circuitry of the first digital circuitry and the entropy checking circuitry of the second digital circuitry may be configured to perform the entropy checking responsive to determining that an entropy check condition has been met. For example, the entropy check condition may be that the apparatus has received a request to generate a random number, such that it can be assured that each generated random number exhibits acceptable randomness. Alternatively or additionally, the entropy check condition may be that a periodic timer has elapsed, such that it is regularly determined that the entropy source is functioning correctly.

As noted above, determining the difference of operation between the first and second digital circuitry can comprise determining a difference between random numbers generated by the first digital circuitry and corresponding random numbers generated by the second digital circuitry. Alternatively or additionally, determining the difference of operation can comprise determining a difference of operation between at least one component of the first digital circuitry and at least one corresponding component of the second digital circuitry. For example, as mentioned earlier it may be determined when the entropy checking circuitry of the first digital circuitry produces a different result from the entropy checking circuitry of the second digital circuitry.

In an example, each of the first digital circuitry and the second digital circuitry comprises control circuitry to receive control information. One of the control circuitry of the first digital circuitry and the control circuitry of the second digital circuitry is configured to control operation of the entropy source responsive to the control information. The control information may be received from other components of the respective digital circuitry. For example, the control information may comprise an indication of randomness of the output of the entropy source. The entropy source can thus be controlled in real time to maintain a desired degree of randomness. The outputs of the control circuitry of the first digital circuitry can be compared with those of the control circuitry of the second digital circuitry, in order to detect faults in the operation thereof.

In one particular example, the first digital circuitry comprises first pseudorandom number production generation circuitry to, based on true random numbers generated by the first digital circuitry, produce pseudorandom numbers. Similarly, the second digital circuitry comprises second pseudorandom number production generation circuitry to, based on true random numbers generated by the second digital circuitry, produce pseudorandom numbers, the second pseudorandom number generation circuitry being a duplicate of the first pseudorandom number generation circuitry. The true random numbers can thus be used as seeds to generate pseudorandom numbers, for example for use in cryptographic operations, in a redundantly fault-resistant manner.

In one such example, the entropy checking circuitry of the first digital circuitry is configured to check the entropy of the output of the entropy source indirectly, by analysis of the true random numbers and/or the pseudorandom numbers produced by the first pseudorandom number production circuitry. Similarly, the entropy checking circuitry of the second digital circuitry is configured to check the entropy of the output of the entropy source by analysis of the true random numbers and/or the pseudorandom numbers produced by the second pseudorandom number production circuitry. In other words, the entropy checking can be based on the true random numbers, the pseudorandom numbers, or both the true random numbers and pseudorandom numbers.

In an example, the first digital circuitry comprises a first cryptographic module to receive the random numbers generated by the first digital circuitry as inputs to a cryptographic operation. Similarly, the second digital circuitry comprises a second cryptographic module to receive the random numbers generated by the second digital circuitry as inputs to a cryptographic operation, the second cryptographic module being a duplicate of the first cryptographic module. Cryptographic operations can thereby be performed, based on true random numbers, in a redundantly fault-resistant manner.

Particular examples of the present disclosure will now be described with reference to the Figures.

FIG. 1 schematically shows a comparative apparatus 100 that does not implement the above-described examples of the present disclosure. The apparatus 100 comprises a true random number generator (TRNG) 105 within which digital circuitry generates true random numbers based on outputs of an entropy source 107 therein.

The apparatus 100 comprises a pseudorandom number generator (PRNG) 110 which receives the true random numbers output from the TRNG 105 and, based on these, generates pseudorandom numbers. The pseudorandom numbers are provided to a cryptographic module 115, within which they are used as inputs to cryptographic operations.

As described above, the apparatus 100 cannot be duplicated to form a redundantly fault-resistant system, because each TRNG 105 in such a duplicated system would produce different true random numbers even during correct operation, such that a difference in operation cannot be taken as indicative of a fault. Indeed, even if the deterministic PRNG 110 and cryptographic module 115 were duplicated, the TRNG 105 could not be and thus any fault in the digital circuitry that generates the random numbers from the outputs of the entropy source 107 could not be detected.

Figure 2:
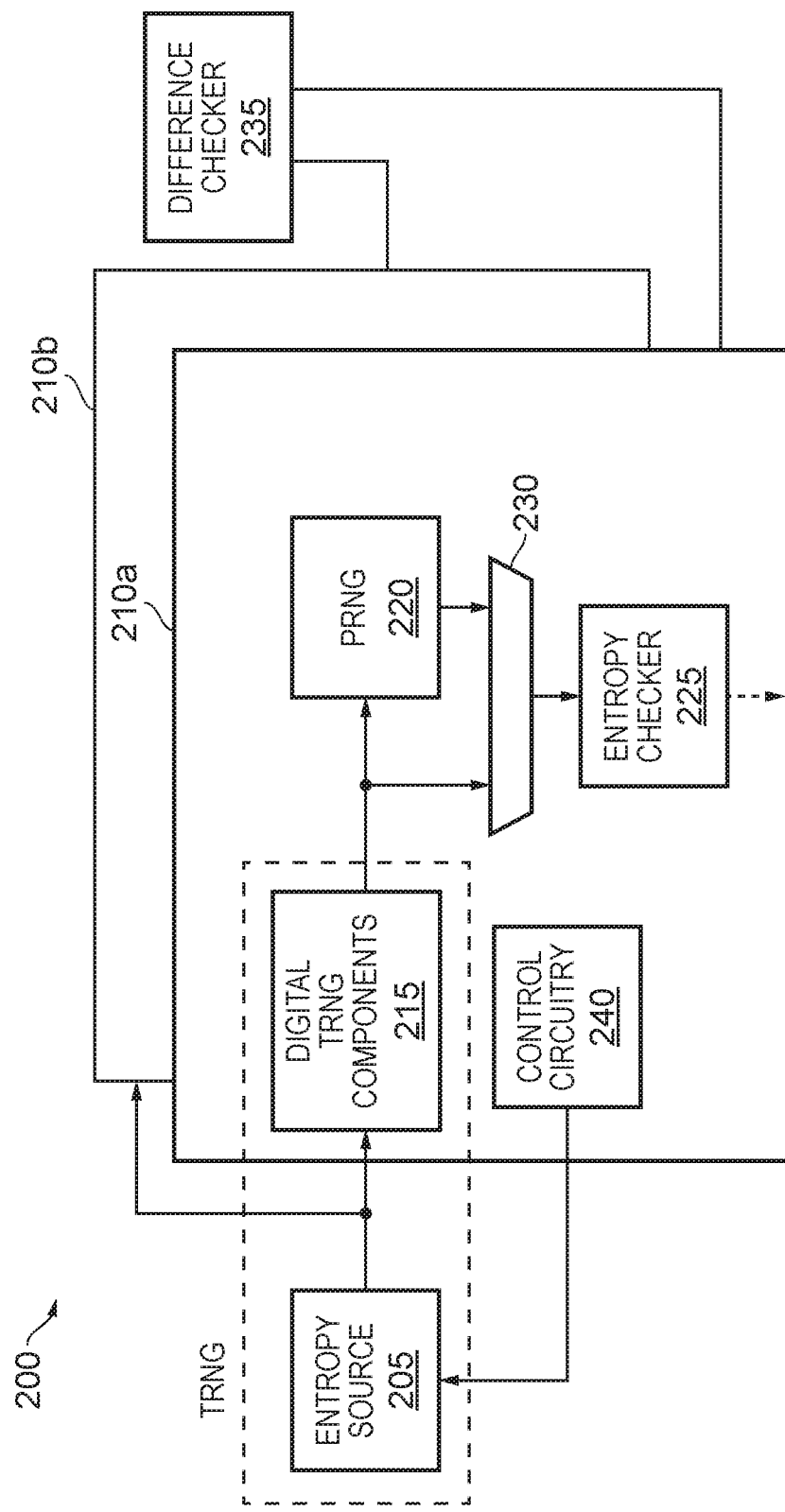
FIG. 2 shows an apparatus according to examples.

FIG. 2 schematically shows an apparatus 200 according to examples of the present disclosure.

The apparatus 200 comprises an analogue entropy source 205, and first and second digital circuitry 210a, 210b. The second digital circuitry 210b is a duplicate of the first digital circuitry 210a, and so for efficiency of representation the interior structure of the second circuitry 210b is not shown.

The first digital circuitry 210a comprises digital TRNG components 215 to receive the outputs of the entropy source 205 and, based on these outputs, produce true random numbers. For example, this may include transforming an output distribution of the entropy source 205 into a uniform distribution of random numbers, for example within a given range.

The entropy source 205 and digital TRNG components 215 can together be considered a TRNG (outlined with dashed lines in FIG. 2), with similar overall functionality to the TRNG 105 of apparatus 100 of FIG. 1. However, the division of the TRNG into analogue and digital components allows the digital components 215 to be duplicated across the first and second digital circuitry 210a, 210b, such that differences in operation of the digital components 215 can be determined. Faults in the operation of the digital TRNG components of one of the first and second digital circuitry 210a, 210b can thus be determined as described below.

The first digital circuitry 210a comprises a PRNG 220 to receive the true random numbers generated by the digital TRNG components 215 and use these as seeds for generating pseudorandom numbers.

The first digital circuitry 210a comprises an entropy checking module 225. The true random numbers generated by the digital TRNG components 215, and/or the pseudorandom numbers generated by the PRNG 220, are provided to the entropy checking module 225 via multiplexer 230. The entropy checking module 225 performs an entropy checking operation on these random numbers to check the entropy of the output of the entropy source 205. The random numbers are, subsequently or simultaneously, provided as inputs to modules (not shown in FIG. 2) such as cryptographic modules. The entropy checking module 225 may be implemented in a variety of ways, but in one example may at least partly be provided within the same processing circuitry as such cryptographic (or other) modules.

The apparatus 200 comprises a difference checker 235 to determine differences in operation between the first digital circuitry 210a and the second digital circuitry 210b. For example, the difference checker 235 may check for differences between the true random numbers and pseudorandom numbers generated within the first digital circuitry 210a and those generated within the second digital circuitry 210b. Alternatively or additionally, the difference checker 235 may check for differences between the operation of the individual components of the first digital circuitry 210a and the corresponding components of the second digital circuitry 210b, such as the entropy checker 225.

The first digital circuitry 210 comprises control circuitry 240 to receive control information from within the first digital circuitry 210a. For example, as explained above the control information may include an indication of randomness of output of the entropy source. The control circuitry 240 controls the operation of the entropy source 205 based on the control information, for example by adjusting operation parameters to maintain randomness at an acceptable level. The second digital circuitry 210b comprises a duplicate of this control circuitry (not shown), which receives corresponding control information from within the second digital circuitry 210b. The difference checker 235 can determine differences between the operation of each control circuitry and thus detect faults therewith.

Figure 3:
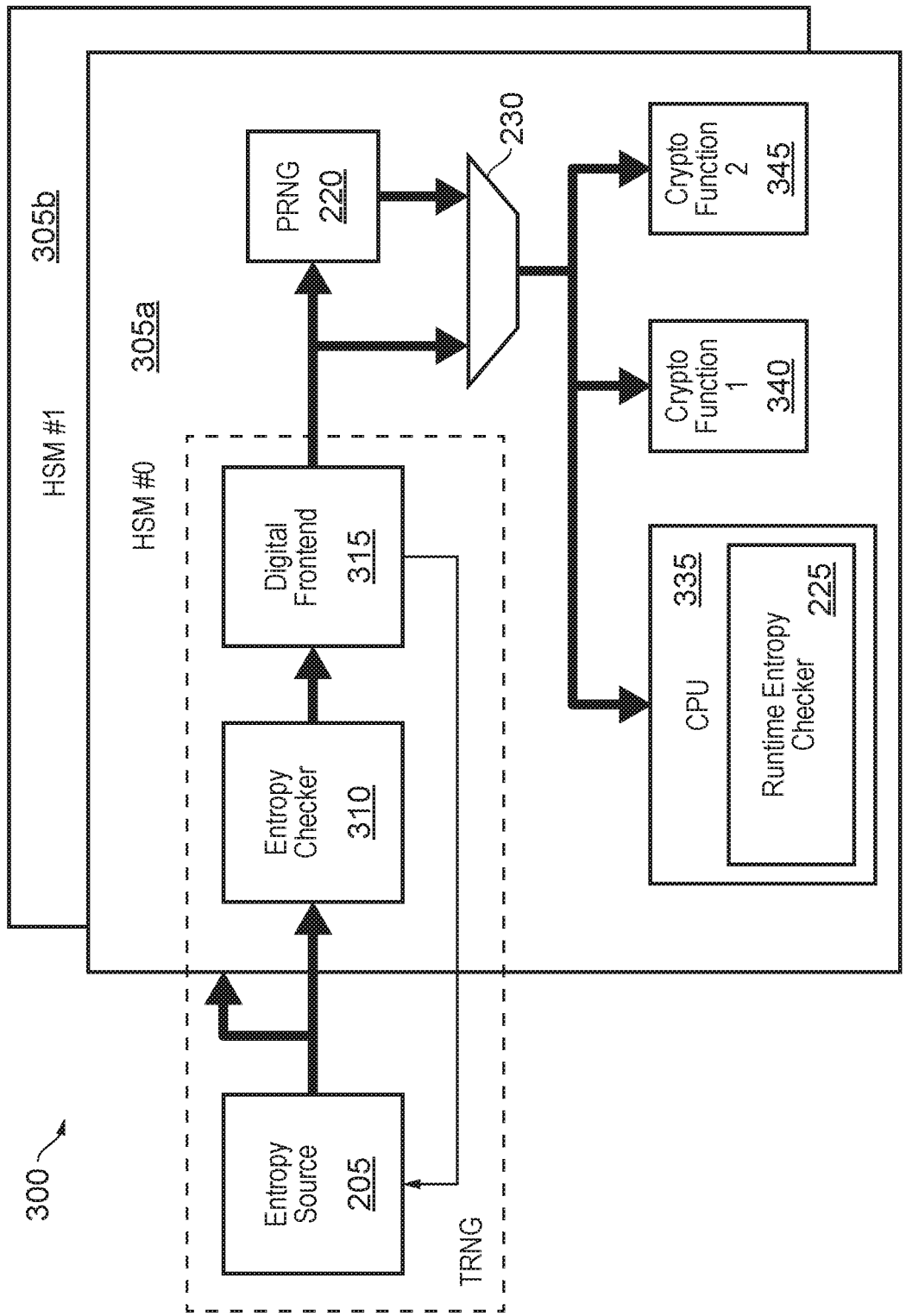
FIG. 3 shows an apparatus according to examples.

FIG. 3 shows schematically an apparatus 300 according to examples of the present disclosure. Some features of apparatus 300 correspond directly to similar features of apparatus 200 of FIG. 2; these features are identified by the same reference numerals as those used in FIG. 2.

The apparatus 300 comprises an entropy source 205.

The apparatus comprises a first hardware security module HSM #0 305a and a second hardware security module HSM #1 305b. The two HSMs 305a, 305b provide redundant fault resistance and correspond broadly to the first and second digital circuitry 210a, 210b of apparatus 200 of FIG. 2. As for FIG. 2, the second HSM 305b is a duplicate of the first HSM 305a, and so the internal structure is only shown for the first HSM 305a.

The first HSM 305a comprises a hardware entropy checker 310 to check the entropy of outputs of the entropy source 205, on a frequent basis, for example every few seconds.

For example, based on such analysis outputs exhibiting reduced randomness may be rejected, and hence random numbers will not be generated based on such outputs.

The entropy checker 310 forwards the outputs of the entropy source 205 (as filtered by the entropy checker 310) to a digital frontend 315. The digital frontend transforms these outputs into uniformly distributed true random numbers, and also feeds control information back to the entropy source 205 for controlling the operation thereof. The entropy source 205, entropy checker 310 and digital frontend 315 can thus together be considered a TRNG (outlined in dashed lines in FIG. 3).

The true random numbers are provided to a PRNG 220 in the same manner as described above in relation to FIG. 2.

The true random numbers and/or pseudorandom numbers are then provided, via multiplexer 230, to a processor 335. The processor 335 implements a runtime entropy checker 225 as described above in relation to FIG. 2.

The true random numbers and pseudorandom numbers are also provided, via the multiplexer 230, to two cryptographic function modules 340, 345. The cryptographic function modules perform cryptographic operations, taking the true random numbers and/or pseudorandom numbers as inputs. The cryptographic function modules 340, 345 can be implemented in hardware as shown. Alternatively or additionally, they can be implemented in software executed by the processor 335.

A difference checker (not shown) checks for differences between the operation of the HSMs 305a, 305b. As explained above, such differences indicate an error in the operation of one of the HSMs, following which an appropriate mitigation action can be taken. For example, the apparatus 300 may be rebooted or shut down, or a presently-executed operation may be repeated.

Figure 4:
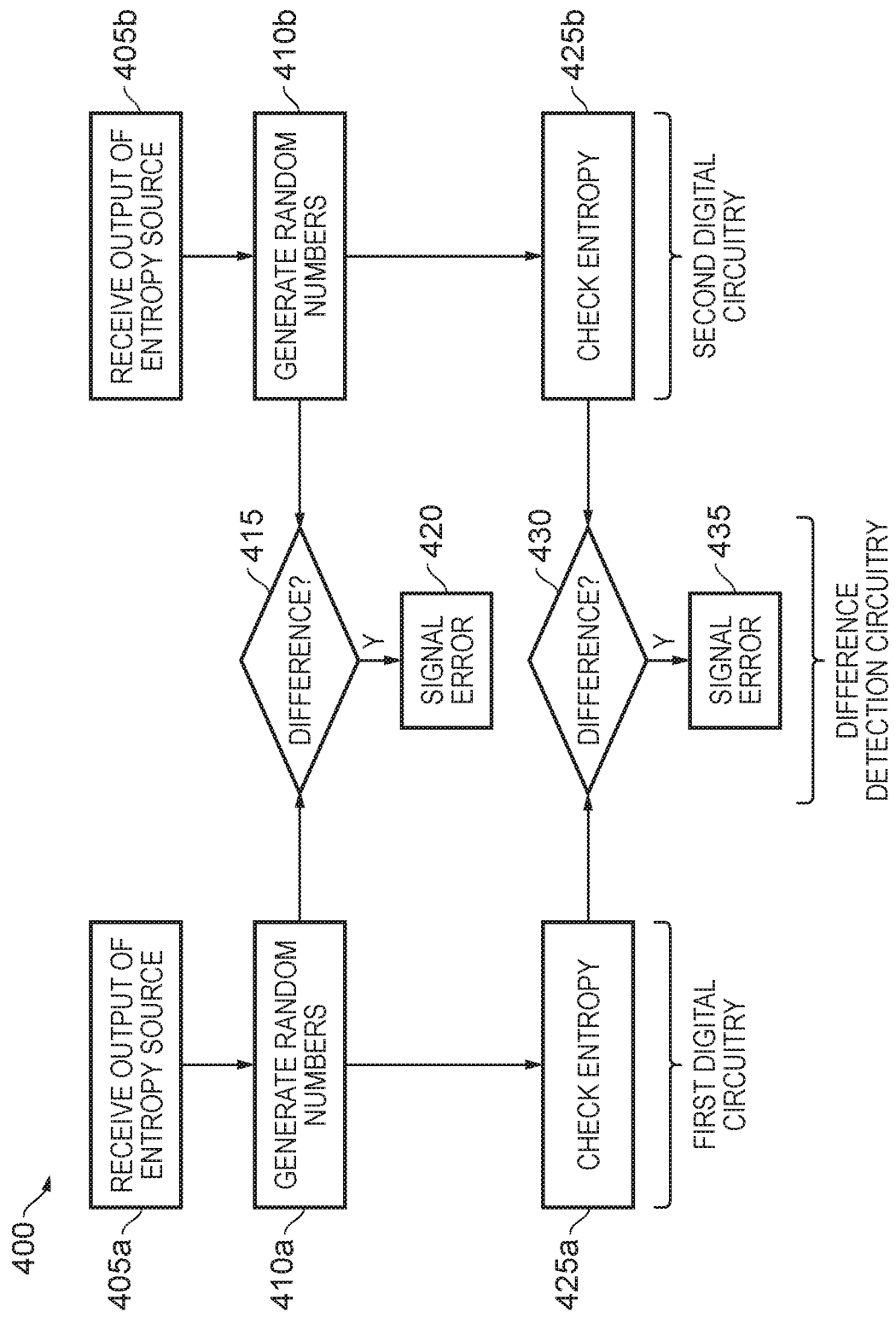
FIG. 4 shows a method for identifying and responding to faults in an apparatus.

FIG. 4 illustrates a method 400 for identifying and responding to faults in apparatuses such as those described above.

At block 405a, an output of an entropy source is received in first digital circuitry. At block 410a, random numbers are generated based on this output.

Simultaneously, in second digital circuitry, at block 405b the same output of the entropy source is received. At block 410b, random numbers are generated based on this output.

At block 415, difference detection circuitry such as the circuitry 235 of FIG. 2 checks for a difference between the generated random numbers. As set out above, under correct operation the first and second digital circuitry would deterministically produce the same output, given the same input. A difference thus indicates a fault in the random number generation component of the first or second digital circuitry.

If a difference is detected, flow proceeds to block 420 where an error is signalled. Otherwise, no error is signalled.

At block 425a, the first digital circuitry (via a runtime entropy checker such as the runtime entropy checker 225 of FIG. 2) checks the entropy of the random numbers generated at block 410a. Simultaneously, at block 425b the second digital circuitry checks the entropy of the random numbers generated at block 410b.

At block 430, the difference detection circuitry checks for a difference between the determined entropies. Similarly as for the checking for differences between generated random numbers at block 415, under correct operation the first and second digital circuitry would determine the same entropy at any given time. A difference thus indicates a fault in the entropy checking component of the first or second digital circuitry.

If a difference is detected, flow proceeds to block 435 where an error is signalled. Otherwise, no error is signalled and the generated random numbers are provided as inputs to modules such as cryptographic modules.

Figure 5:
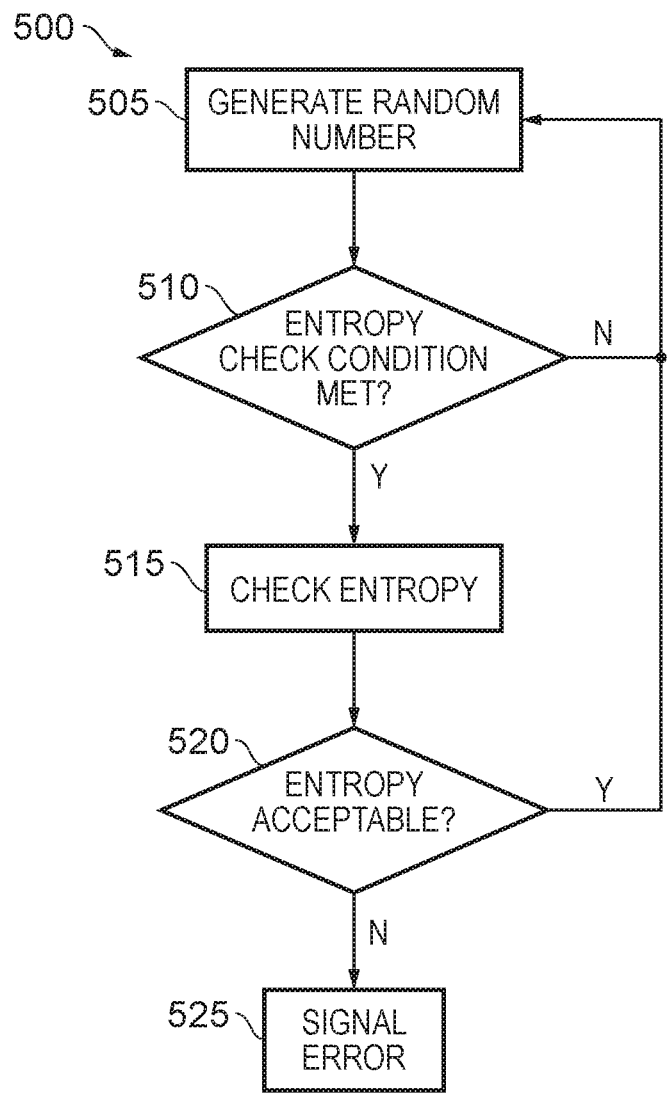
FIG. 5 shows a method for checking the entropy of outputs of an entropy source.

FIG. 5 illustrates a method 500 for checking the entropy of outputs of an entropy source. For example, the method may be implemented in the entropy checker 225 as described above in relation to FIGS. 2 and 3.

At block 505, a random number is generated based on outputs from an entropy source.

At block 510, it is determined whether an entropy check condition is met. For example, an entropy check condition may trigger each time a request is received to generate a random number. As another example, an entropy check condition may trigger based on a periodic timer elapsing.

If the entropy check condition is not met, flow returns to block 505 and the method 500 restarts. Otherwise, flow proceeds to block 515, where the entropy of generated random numbers is checked.

At block 520, it is determined whether the entropy is acceptable, i.e. whether the determined entropy indicates an acceptable degree of randomness in the random numbers generated at block 505. If the entropy is acceptable, flow returns to block 505 and the method restarts. The generated random numbers are also provided to modules such as cryptographic modules. If the entropy is determined to be unacceptable, flow proceeds to block 525 where an error is signalled. Following this, a suitable error mitigation action can be taken. For example, the method may terminate as shown such that no further random numbers are generated.

Apparatuses and methods are thus provided for providing redundant fault-resistance to systems in which true random numbers are generated and used. Such fault tolerance is particularly important in safety-critical applications such as control systems of automated vehicles.

From the above description it will be seen that the technique described herein provides a number of significant benefits. Firstly it enables the use of entropy level as a measure of integrity of the entropy source in the context of functional safety. Further the techniques described herein perform repeated execution of entropy checking software during runtime as a mechanism to ensure entropy source integrity. Furthermore, the technique makes use of redundant hardware to run entropy checking software to ensure integrity of the checking mechanism.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An apparatus comprising:
analog circuitry comprising an entropy source, the entropy source being configured to provide a random output;
first digital circuitry to receive the output of the entropy source and, based on said output, generate random numbers;
second digital circuitry to receive the output of the entropy source and, based on said output, generate random numbers, the second digital circuitry being a duplicate of the first digital circuitry; and
difference detection circuitry to determine a difference of operation between the first digital circuitry and the second digital circuitry,
wherein each of the first digital circuitry and the second digital circuitry comprises entropy checking circuitry to check the entropy of the output of the entropy source.

2. An apparatus according to claim 1, wherein the entropy checking circuitry of the first digital circuitry and the entropy checking circuitry of the second digital circuitry are configured to perform an entropy checking operation comprising:

where the determined entropy indicates that the output of the entropy source has a degree of randomness below an acceptable level, signalling an error.

3. An apparatus according to claim 1, wherein the entropy checking operation performed by each of the entropy checking circuitry of the first digital circuitry, and the entropy checking circuitry of the second digital circuitry, is a runtime entropy checking operation.

4. An apparatus according to claim 1, wherein each of the entropy checking circuitry of the first digital circuitry and the entropy checking circuitry of the second digital circuitry is configured to perform the entropy checking responsive to determining that an entropy check condition has been met.

5. An apparatus according to claim 4, wherein the entropy check condition is that the apparatus has received a request to generate a random number.

6. An apparatus according to claim 4, wherein the entropy check condition is that a periodic timer has elapsed.

7. An apparatus according to claim 1, wherein determining the difference of operation comprises determining a difference between random numbers generated by the first digital circuitry and corresponding random numbers generated by the second digital circuitry.

8. An apparatus according to claim 1, wherein determining the difference of operation comprises determining a difference of operation between at least one component of the first digital circuitry and at least one corresponding component of the second digital circuitry.

9. An apparatus according to claim 1, wherein the difference detection circuitry is configured to, responsive to detecting a difference of operation between the first digital circuitry and the second digital circuitry, signal an error.

10. An apparatus according to claim 1, wherein each of the first digital circuitry and the second digital circuitry comprises control circuitry to receive control information, one of the control circuitry of the first digital circuitry and the control circuitry of the second digital circuitry being configured to control operation of the entropy source responsive to the control information.

11. An apparatus according to claim 10, wherein the control information comprises an indication of randomness of the output of the entropy source.

12. An apparatus according to claim 1, wherein:
each of the entropy checking circuitry of the first digital circuitry and the entropy checking circuitry of the second digital circuitry is implemented within respective processing circuitry; and
each processing circuitry is configured to receive random numbers generated within the associated digital circuitry as an input to data processing operations.

13. An apparatus according to claim 12, wherein each entropy checking circuitry is implemented in firmware of the respective processing circuitry.

14. An apparatus as claimed in claim 1, wherein the random numbers generated by the first digital circuitry and the second digital circuitry are true random numbers, and the entropy checking circuitry is arranged to check the entropy of the output of the entropy source by analysis of the true random numbers generated by the associated digital circuitry.

15. An apparatus according to claim 1, wherein:
the random numbers generated by the first digital circuitry and the second digital circuitry are true random numbers;
the first digital circuitry comprises first pseudorandom number production generation circuitry to, based on true random numbers generated by the first digital circuitry, produce pseudorandom numbers; and
the second digital circuitry comprises second pseudorandom number production generation circuitry to, based on true random numbers generated by the second digital circuitry, produce pseudorandom numbers, the second pseudorandom number generation circuitry being a duplicate of the first pseudorandom number generation circuitry.

16. An apparatus according to claim 15, wherein:
the entropy checking circuitry of the first digital circuitry is configured to check the entropy of the output of the entropy source by analysis of the true random numbers and/or the pseudorandom numbers produced by the first pseudorandom number production circuitry; and
the entropy checking circuitry of the second digital circuitry is configured to check the entropy of the output of the entropy source by analysis of the true random numbers and/or the pseudorandom numbers produced by the second pseudorandom number production circuitry.

17. An apparatus according to claim 1, wherein:
the first digital circuitry comprises a first cryptographic module to receive the random numbers generated by the first digital circuitry as inputs to a cryptographic operation; and
the second digital circuitry comprises a second cryptographic module to receive the random numbers generated by the second digital circuitry as inputs to a cryptographic operation, the second cryptographic module being a duplicate of the first cryptographic module.

18. An apparatus according to claim 1, wherein the entropy checking circuitry of the first digital circuitry and the entropy checking circuitry of the second digital circuitry are further configured to:
where the determined entropy indicates that a given output of the entropy source indicates a degree of randomness below an acceptable level, exclude the given output from further processing.

19. A method comprising:
receiving, at first digital circuitry and second digital circuitry a random output from an entropy source, the second digital circuitry being a duplicate of the first digital circuitry;
with the first digital circuitry:
generating random numbers based on said output; and
checking the entropy of said output,
with the second digital circuitry:
generating random numbers based on said output; and
checking the entropy of said output, and
determining a difference of operation between the first digital circuitry and the second digital circuitry.

20. An apparatus comprising:
means for providing an entropy source, the entropy source being configured to provide a random output;
first means for receiving the output of the entropy source and, based on said output, generate random numbers;
second means for receiving the output of the entropy source and, based on said output, generate random numbers, the second means being a duplicate of the first means; and
means for determining a difference of operation between the first digital means and the second means, wherein each of the first means and the second means comprises means for checking the entropy of the output of the entropy source.

* * * * *